United States Patent
Hua et al.

(10) Patent No.: US 10,159,990 B2
(45) Date of Patent: Dec. 25, 2018

(54) DUST SEPARATION APPARATUS AND INTELLIGENT CONTROL SYSTEM INCLUDING THE APPARATUS

(71) Applicant: HARVEY INDUSTRIES CO., LTD., Jiangsu (CN)

(72) Inventors: Yi Hua, Jiangsu (CN); Qinghai Xu, Jiangsu (CN); Xinning Li, Jiangsu (CN); Xiaogang Qin, Jiangsu (CN); Huizi Pan, Jiangsu (CN); Huazhong Sun, Jiangsu (CN)

(73) Assignee: HARVEY INDUSTRIES CO., LTD., Jiangsu (CN)

( * ) Notice: Subject to any disclaimer, the term of this patent is extended or adjusted under 35 U.S.C. 154(b) by 0 days.

(21) Appl. No.: 15/527,325

(22) PCT Filed: Aug. 23, 2016

(86) PCT No.: PCT/CN2016/096439
§ 371 (c)(1),
(2) Date: May 17, 2017

(87) PCT Pub. No.: WO2017/036326
PCT Pub. Date: Mar. 9, 2017

(65) Prior Publication Data
US 2017/0333918 A1    Nov. 23, 2017

(30) Foreign Application Priority Data

Sep. 6, 2015  (WO) ............... PCT/CN2015/088949
Sep. 11, 2015  (CN) .................... 2015 2 0705041 U

(51) Int. Cl.
*B01D 46/46*     (2006.01)
*B04C 5/103*     (2006.01)
(Continued)

(52) U.S. Cl.
CPC .............. *B04C 5/103* (2013.01); *B01D 45/12* (2013.01); *B01D 45/14* (2013.01); *B01D 50/002* (2013.01);
(Continued)

(58) Field of Classification Search
CPC .......... B04C 5/103; B04C 11/00; B04C 9/00; B04C 5/185; B04C 2009/005; B04C 2009/002; B01D 45/14; B01D 50/002
See application file for complete search history.

(56) References Cited

U.S. PATENT DOCUMENTS 3,793,812 A * 2/1974 Willis .................... B01D 45/12
                                                         55/319
4,212,653 A * 7/1980 Giles ..................... B01D 45/16
                                                         209/716
(Continued)

FOREIGN PATENT DOCUMENTS

CN        85204251       10/1986
CN        2294785        10/1998
(Continued)

OTHER PUBLICATIONS

"International Search Report (Form PCT/ISA/210)", dated Nov. 28, 2016, with English translation thereof, pp. 1-6.
(Continued)

Primary Examiner — Dung H Bui
(74) Attorney, Agent, or Firm — JCIPRNET

(57) ABSTRACT

The dust separation apparatus includes a dust intake unit including a blower, an inertial separation unit, a centrifugal separation unit, and a filtering separation unit. The dust intake unit, the inertial separation unit, the centrifugal separation unit, and the filtering separation unit are sequentially connected in series and together form a horizontal structure. The inertial separation unit and the centrifugal separation
(Continued)

unit are connected in a horizontal-axis direction to form an inertial and centrifugal separation unit. A dust collection box is provided below and connected to the inertial and centrifugal separation unit. The filtering separation unit includes a dust collection barrel. The intelligent control system includes the dust separation apparatus and an intelligent control unit.

4 Claims, 7 Drawing Sheets

(51) Int. Cl.
| | |
|---|---|
| B04C 5/26 | (2006.01) |
| B01D 45/12 | (2006.01) |
| B04C 5/185 | (2006.01) |
| B04C 7/00 | (2006.01) |
| B04C 11/00 | (2006.01) |
| B01D 45/14 | (2006.01) |
| B01D 50/00 | (2006.01) |
| B04C 9/00 | (2006.01) |
| A47L 9/16 | (2006.01) |

(52) U.S. Cl.
CPC ............... *B04C 5/185* (2013.01); *B04C 5/26* (2013.01); *B04C 7/00* (2013.01); *B04C 9/00* (2013.01); *B04C 11/00* (2013.01); *A47L 9/1625* (2013.01); *A47L 9/1683* (2013.01); *B04C 2009/002* (2013.01); *B04C 2009/005* (2013.01)

(56) References Cited

U.S. PATENT DOCUMENTS

| | | | | |
|---|---|---|---|---|
| 4,361,490 | A * | 11/1982 | Saget | B04B 5/12 210/787 |
| 7,156,889 | B1 * | 1/2007 | Swanson | B01D 45/16 55/337 |
| 9,427,689 | B2 * | 8/2016 | Kochubei | B01D 45/16 |
| 2003/0033791 | A1 * | 2/2003 | Elliott | B01D 45/16 55/396 |
| 2003/0167740 | A1 * | 9/2003 | Murphy | B01D 45/16 55/337 |
| 2009/0025348 | A1 * | 1/2009 | Cheng | B01D 45/02 55/385.1 |
| 2009/0178568 | A1 * | 7/2009 | Yoo | A47L 9/122 96/416 |
| 2010/0218467 | A1 * | 9/2010 | Witter | B01D 45/12 55/337 |
| 2010/0275561 | A1 * | 11/2010 | Lundquist | B04C 3/00 55/456 |
| 2011/0203234 | A1 * | 8/2011 | Wolsfeld | B01D 45/08 55/307 |
| 2012/0103423 | A1 * | 5/2012 | Schook | B01D 45/16 137/1 |
| 2012/0111196 | A1 * | 5/2012 | Schook | B01D 17/0217 95/271 |
| 2014/0116255 | A1 * | 5/2014 | Perez Guerra | B04C 3/00 96/216 |
| 2015/0283780 | A1 * | 10/2015 | Fakeris | B01D 50/004 95/219 |
| 2015/0328571 | A1 * | 11/2015 | Son | B04C 3/06 55/418 |
| 2016/0059169 | A1 * | 3/2016 | Cheng | B01D 46/0004 55/482 |

FOREIGN PATENT DOCUMENTS

| | | | | |
|---|---|---|---|---|
| CN | 202725357 | | 2/2013 | |
| CN | 104841229 | | 8/2015 | |
| CN | 105268555 | | 1/2016 | |
| CN | 205087606 | | 3/2016 | |
| EP | 1493489 | | 1/2005 | |
| JP | H1024254 | | 1/1998 | |
| WO | WO-2014202198 | A1 * | 12/2014 | ............ F01L 1/047 |

OTHER PUBLICATIONS

"Written Opinion of the International Searching Authority (Form PCT/ISA/237)" of PCT/CN2016/096439, dated Nov. 23, 2016, pp. 1-9.

* cited by examiner

DUST SEPARATION APPARATUS AND INTELLIGENT CONTROL SYSTEM INCLUDING THE APPARATUS

CROSS-REFERENCE TO RELATED APPLICATION

This application is a 371 application of an international PCT application Ser. no. PCT/CN2016/096439, filed on Aug. 23, 2016, which claims priority to and the benefit of an international PCT application serial no. PCT/CN2015/088949, filed on Sep. 6, 2015, and China Patent Application No. 201520705041.0, filed on Sep. 11, 2015, the disclosures of which are incorporated herein by reference in its entirety.

BACKGROUND OF THE INVENTION

Field of the Invention

The present invention belongs to the technical field of dust separation, collection, and filtering, and more particularly to a dust separation apparatus and an intelligent control system including the apparatus.

Description of Related Art

At present, an inertial separation technology, a filtering separation technology or a combination of the two technologies is used in almost all dust separation apparatuses. The most commonly used at present is a cyclone dust separation apparatus. Such an apparatus is an apparatus that combines an inertial separation technology and a filtering separation technology.

Referring to FIG. 1, the cyclone dust separation apparatus includes a cylindrical body 10, a conical body 20, an air inlet pipe 30, a dust discharge pipe 40, a dust collection box 50, an air discharge pipe 60, a transfer chamber 70, a filter cylinder 80, and a dust collection bag 90. The air inlet pipe 30 is connected to the cylindrical body 10. The cylindrical body 10 is connected to the conical body 20 in a vertical-axis direction. The dust collection box 50 is connected to the conical body 20. The cylindrical body 10 is connected to the filter cylinder 80 through the air discharge pipe 60 and the transfer chamber 70 sequentially. The filter cylinder 80 and the cylindrical body 10 are arranged in parallel in the vertical-axis direction. The filter cylinder 80 is connected to the dust collection bag 90 located below the filter cylinder 80.

When the cyclone dust separation apparatus is in operation, dust-containing air enters the dust removal apparatus at a high speed in a tangential direction from the air inlet pipe of the dust removal apparatus. The air flow changes from linear movement into movement of spiral rotation down a wall of the cylinder, and this air flow is usually referred to as an outer rotational flow. When the outer rotational flow moves downwards to the portion of the conical body, because of narrowing of the conical shape, the outer rotational flow is closer to the center of the dust removal apparatus. According to a principle that the rotating torque stays unchanged, the tangential speed of the outer rotational flow keeps increasing. When reaching the bottom of the conical body, the outer rotational flow turns to move upwards and rotates upwards along an axis in the same rotational direction. Finally, the outer rotational flow is discharged via the discharge pipe into the transfer chamber and then the filter cylinder. During the rotational movement of the air flow, some of the relatively large dust particles collide with the cylinder wall to lose the inertial force, and is driven by the gravitational force and the rotational air flow to slide downwards against a wall surface of the conical body into the dust collection box. Relatively small particles overcome the convergence resistance under the effect of the centrifugal force, and stay separated at the portions of the cylindrical body and the conical body. The separated dust is driven by the gravitational force and the rotational air flow to move spirally downwards, enter the conical body to be collected at the bottom of the conical body, and enter the dust collection box. Dust that is not separated enters the filter cylinder through the air discharge pipe. After the dusty air is filtered through the filter cylinder, clean air is discharged. A part of the dust drops into the dust collection bag under the effect of the gravitational force, and another part of the dust stays attached to a wall of the filter cylinder.

Such a dust separation apparatus has the following defects in use:

1. By using the inertial separation method, only dust having relatively large particle diameters can be separated. About 50% of dust is separated. The rest dust needs to be filtered through the filter cylinder. The filter cylinder is required to filter a large amount of dust, and a substantial part of dust is attached to a wall of the filter cylinder. Thus, the filter screen is highly prone to clogging, and the dust removal effect is severely affected.

2. The large amount of dust enters the filter cylinder. The dust collection bag below the filter cylinder requires to be frequently replaced. When the dust collection bag is removed, some dust is scattered, resulting in secondary pollution of dust.

3. To improve the separation efficiency of dust, the conical body is designed to be relatively long, the device is relatively high and has a large volume, and the device has much vibration and noise and is also not convenient to move.

4. The dust collection box generally has a floor type. When the ground has an uneven surface, the connection between the dust collection box and the dust separation device is poorly sealed, resulting in phenomena that air leaks and dust escapes.

5. The device can support only simple ON and OFF operations, without intelligent control capability. The device cannot be started or stopped in coordination with a machine that generates dust. Operation data of the device cannot be collected in real time. The working condition of the device in operation cannot be monitored in real time based on the collected data, and further, intelligent control cannot be performed based on the data of the working condition.

6. The device can be operated at only a fixed rotational speed, without capabilities of adjusting the speed and controlling the power constant at a rated power. When a pipe network environment changes, a change in the power of the motor cannot be monitored on line in real time, and a rotational speed of the motor cannot be automatically adjusted to make the motor be constant at the rated power. The efficiency of the blower is also lower than the maximum designed efficiency. When a small-diameter dust collection pipe is used for dust collection, the power of the motor and the efficiency of the blower are reduced and the dust collection capability is reduced. When a large-diameter dust collection pipe is used for dust collection, the device may be overloaded.

SUMMARY OF THE INVENTION

To overcome the foregoing technical defects one by one, the present invention is intended to provide several technical solutions that are technically correlated to each other. To solve the defects 1 to 3, a first objective of the present invention is to provide a dust separation apparatus. By means of the dust separation apparatus, the dust removal efficiency is high, the emission concentration is low, the dust removal effect is good, a filter screen is less prone to clogging, dust is easy to clean, the secondary pollution of dust is avoided, the device has a small volume, and the working noise is low.

The used technical solution is as follows:

A dust separation apparatus includes a dust intake unit including a blower, an inertial separation unit, a centrifugal separation unit, and a filtering separation unit. The dust intake unit, the inertial separation unit, the centrifugal separation unit, and the filtering separation unit are sequentially connected in series and together form a horizontal structure. The inertial separation unit and the centrifugal separation unit are connected in a horizontal-axis direction to form an inertial and centrifugal separation unit. A dust collection box is provided below and connected to the inertial and centrifugal separation unit. The filtering separation unit includes a dust collection barrel.

In the technical solution, dust separation units that correspond to three dust removal technologies, that is, inertial separation, centrifugal separation, and filtering separation of dust are serially connected, and centrifugal separation is added to ensure that following inertial separation and centrifugal separation, most dust having large particle diameters is separated and only a very small amount of fine dust enters a filtering unit, so that the dust removal efficiency is high, and a filter screen is less prone to clogging; a horizontal structure is used and an inertial and centrifugal separation unit is formed, during separation by a centrifugal force, a separation force of the inertial and centrifugal separation unit for dust may equal 70 times to 100 times of the weight of the dust and is far greater than a gravitational separation force in an existing cyclone dust separator, such a great dust separation force may enable dust to be separated from air inside a small and short air duct, such that the air duct may have a reduced diameter and length and a horizontal structure can be designed, thereby greatly reducing the height and volume of the device, and when the air duct becomes small and short, the working noise is also reduced; a dust collection box is arranged below the inertial and centrifugal separation unit, so that most of the dust is separated into the dust collection box and only a very small amount of fine dust enters a filter cylinder for filtering separation, thereby greatly reducing the workload of a filter cartridge; because a small amount of dust enters a filtering separation unit, dust inside the dust collection box below the filter cylinder is easy to clean, thereby avoiding the secondary pollution of dust.

Preferably, a conical guide block, a baffle, and a cyclone blade that are sequentially and fixedly connected are disposed inside a chamber of the inertial and centrifugal separation unit, the conical guide block is placed in the middle of the chamber, and a first air duct is formed at a periphery of the conical guide block; the baffle is provided with a cavity, a plurality of through holes are provided on a surface of the baffle, a second air duct is formed at an outer periphery of the baffle and a third air duct is formed inside the cavity of the baffle; and the cyclone blade has a spiral form, a tangential direction of the cyclone blade points to the dust collection box, a fourth air duct is formed at a periphery of the cyclone blade, the first air duct, the second air duct, the third air duct, and the fourth air duct are connected sequentially, and both the second air duct and the fourth air duct are connected to the dust collection box. In this way, dust is guided by the conical guide block, is separated around the conical guide block, and then hits the baffle behind to fall in the dust collection box. Then, an air flow is forcefully pulled by the fixed cyclone blade to turn into a spiral air flow, and the dust moves in the spiral air flow, rotates at a high speed under the effect of the centrifugal force, and enters the dust collection box in the tangential direction, so as to improve the dust removal effect.

Further preferably, a conical flow-guide mechanism and a flow-guide outlet pipe are also disposed inside the chamber of the inertial and centrifugal separation unit, the conical flow-guide mechanism and the flow-guide outlet pipe are both located in the middle of the chamber, and a conical tip of the conical flow-guide mechanism is made to approach, be level with or enter a pipe port of the flow-guide outlet pipe; a fifth air duct is formed at a periphery of the conical flow-guide mechanism and the flow-guide outlet pipe, and a sixth air duct is formed inside the flow-guide outlet pipe; and the fifth air duct is connected to the fourth air duct, and the fifth air duct is connected to the dust collection box. In this way, the fine dust may follow a flow-guide effect of the conical flow-guide mechanism, and the air flow smoothly enters the flow-guide outlet pipe and further enters the filtering separation unit, thereby reducing turbulence of the air flow and reducing noise.

Preferably, the inertial separation unit, the centrifugal separation unit, and the filtering separation unit that are sequentially connected in series form one or a plurality of separation units, and when a plurality of separation units is formed, each of the separation units is connected to the dust intake unit; and where the dust intake unit has a fixed intake air volume for dust, a pipe diameter of each separation unit is designed such that an air flow rate is controlled between 13 m/s and 22 m/s. In this way, the centrifugal force of dust particles is increased, thereby improving the separation efficiency of dust. According to different intake air volumes for dust and spatial and structural requirements, one or more separation units may be designed. A pipe diameter of each separation unit depends on an intake air volume. Generally, a flow speed of air in the separation unit is set between 13 m/s and 22 m/s.

Preferably, a roller and a fastener are disposed on the dust collection box, the miler is provided with a track, the inertial and centrifugal separation unit is provided with a retaining ring, and mounting and removal of the dust collection box are achieved by means of sliding of the roller on the track and fastening and releasing of the fastener on the retaining ring. In this way, the defect 4 in the prior art may be overcome. Because guiderail conveyance and coordination and connection with the inertial and centrifugal separation unit are used, a sealing problem may be solved, and mounting and removal are also convenient.

Preferably, the filtering separation unit includes a filter cylinder and the dust collection barrel located below the filter cylinder, the dust collection barrel is provided with a dust cleaning hole having a standard dust-collection-pipe diameter, and the dust cleaning hole is provided with a sealing cap and a dust collection pipe; the sealing cap is configured to cover the dust cleaning hole in a sealed manner, and the dust collection pipe is configured to be connected to the dust cleaning hole and the blower. In this way, normally, the cover is used for sealing, and when cleaning is required, the dust collection pipe may be connected to a dust collection port of the dust intake unit to automatically clean fine dust inside the dust collection barrel without causing dust to fly and secondary pollution of dust, thereby further solving the defect 2 in the prior art, and implementing a sealed self-cleaning function of dust.

A second objective of the present invention is to provide a dust separation method, including the following steps:

S1. arranging a dust intake unit to suck dust;

S2. arranging an inertial separation unit, a centrifugal separation unit, and a filtering separation unit that are sequentially connected in series and as one piece in a horizontal structure, to perform inertial separation, centrifugal separation, and filtering separation sequentially on the dust in S1 according to the diameter of dust particles, so that following the inertial separation and the centrifugal separation, 97%-99% of dust having large particle diameters is separated, and the remaining fine dust is filtered and separated by the filtering separation unit; and S3. connecting the inertial separation unit to the centrifugal separation unit in a horizontal-axis direction to form an inertial and centrifugal separation unit, and arranging a dust collection box that is located below and connected to the inertial and centrifugal separation unit, to receive the 97%-99% of dust having large particle diameters in S2.

By means of the dust separation method, an inertial separation unit and a centrifugal separation unit are connected in a horizontal-axis direction to form an inertial and centrifugal separation unit, and 97%-99% of dust having large particle diameters is separated into the dust collection box, so that the defects 1 to 3 in the prior art can be overcome, and the following technical effects can be achieved: the dust removal efficiency is high, the emission concentration is low, the dust removal effect is good, a filter screen is less prone to clogging, the secondary pollution of dust is avoided, and the used device has a small volume and low working noise.

A third objective of the present invention is to provide an intelligent control system for dust separation, including the dust separation apparatus according to any of the solutions above and an intelligent control unit. The intelligent control unit includes a master-machine controller mounted on the dust separation apparatus and a slave-machine controller mounted on a dust-generating device for dust removal. The master-machine controller includes a first MCU control module, an I/O interface module, and a first WiFi wireless communication module, and the first MCU control module is connected to an external device through the I/O interface module, and communicates with the slave-machine controller through the first WiFi wireless communication module. The slave-machine controller consists of a second MCU control module, an interface module, a second WiFi wireless communication module, and a current transformer. The current transformer is configured to detect a current value of a motor of the dust-generating device, and the second MCU control module determines, according to the current value, whether the dust-generating device is in an on or off state, and sends the state of the device to the master-machine controller through the second WiFi wireless communication module. The master-machine controller controls, according to the state of the dust-generating device, the dust separation apparatus to start or stop through a frequency converter.

This intelligent control system can overcome the defects 5 and 6 in the prior art. A master-machine controller and a slave-machine controller are used to implement coordinated starting and stopping with a dust-generating device, delayed stopping, setting of a rotational speed of a blower, and real-time collection and display of operation parameters such as a dusty-air pressure in an air duct, a dust height in a dust box, and a power load of a motor, and real-time monitoring of the working condition. When the working condition is abnormal, an alarm indication may be provided and stopping control may be performed, thereby ensuring safety and reliability of the dust separation apparatus in operation.

A fourth objective of the present invention is to provide an intelligent control method of the intelligent control system for dust separation in the solution above, including the following steps:

S10: setting operation control parameters of the dust separation apparatus on the master-machine controller, collecting a dusty-air pressure, a dust height in a dust box, a rotational speed of a motor, and a power of the motor in the dust separation apparatus in real time, monitoring operation parameters in real time, and determining whether the working condition is abnormal;

S20: when the working condition is abnormal, providing an alarm indication and automatically stopping the dust separation apparatus; and S30: automatically detecting, by the slave-machine controller, the on and off of the dust-generating device and communicating with the master-machine controller through the WiFi wireless communication technology, and controlling, by the master-machine controller, the dust separation apparatus to start or stop to coordinate with the dust-generating device, wherein S10 and S30 may be performed at the same time.

Preferably, the intelligent control method further includes S40: when a pipe network environment changes, automatically detecting, by the master-machine controller, a change in the output power of the motor, and automatically adjusting the rotational speed of the blower, to make the output power of the motor stay constant at a rated power, and to make the working efficiency of the blower stay constant at the maximum designed efficiency. In this way, it can be ensured that the motor keeps operating at full load and the motor is not overloaded. Also, it is ensured that the working efficiency of the blower stays constant at the maximum designed efficiency. When a small-diameter dust collection pipe is used for dust collection, the dust collection capability can be improved. When a large-diameter dust collection pipe is used for dust collection, it can be ensured that the motor is not overloaded.

In conclusion, beneficial effects of the present invention include the following:

1. In the present invention, technologies of inertial separation, centrifugal separation, and filtering separation of dust are serially integrated. Following inertial separation and centrifugal separation, most of the dust having large particle diameters is separated into a dust box, and only a very small amount of fine dust enters a filter cylinder for filtering separation. This apparatus and method greatly reduce dust concentration on a surface of a filter screen, a filter cartridge is less prone to clogging, and an overall dust removal effect is good. A filter cartridge can work for a vastly extended time before the filter cartridge requires to be cleaned or replaced, and a service life is longer.

2. During dust separation, because an efficient centrifugal separation technology is used, a dust-separation air duct is designed to be arranged in a horizontal direction and has a greatly reduced diameter and length, and the device is designed in a horizontal structure. The device has a small volume and is movable, the air duct has a small diameter and a short length, and the aerodynamic noise is low.

3. Each separation unit forms one dust-separation air duct. When a plurality of dust-separation air ducts of this type is connected in parallel, an overall dust removal capability of a dust separation apparatus can be improved.

4. A unique structural design of a dust collection box is used, so that a cleaning operation of dust is very convenient, and secondary pollution of dust can be avoided.

5. Coordinated starting and stopping of an intelligent control system and a dust separation apparatus are achieved by using an intelligent control unit, thereby achieving purposes of energy saving and ease of operation. Operation parameters such as an air pressure in an air duct, a dust height in a dust box, a rotational speed of a blower, and a current of a motor can be collected in real time, and the working condition of the device in operation is monitored in real time. For an abnormal working condition, an alarm indication can be provided and automatic stopping can be performed, thereby ensuring safety and reliability of the device in operation.

6. An output power of a motor of a blower can be kept constant at a rated power, and it can be ensured that the operation efficiency of the blower stays constant at the maximum designed efficiency. When a small-diameter dust collection pipe is used for dust collection, a rotational speed of the blower is automatically increased to improve the dust collection capability. When a large-diameter dust collection pipe is used for dust collection, if the load is excessively heavy, the rotational speed of the blower is automatically reduced to ensure that the motor is not overloaded.

BRIEF DESCRIPTION OF THE DRAWINGS

To describe the technical solutions in the embodiments of the present invention or in the prior art more clearly, the accompanying drawings required for describing the embodiments or the prior art are briefly introduced below. It is clear that the accompanying drawings in the following description only show embodiments of the present invention, and persons of ordinary skill in the art may still derive other drawings from these accompanying drawings without creative efforts.

DETAILED DESCRIPTION OF THE INVENTION

The technical solutions in the embodiments of the present invention are clearly and fully described below with reference to the accompanying drawings in the embodiments of the present invention. It is clear that the described embodiments are merely preferred embodiments of the present invention rather than all the embodiments of the present invention. All other embodiments, obtained by persons of ordinary skill in the art based on the embodiments of the present invention without creative efforts, shall fall within the protection scope of the present invention.

Embodiment 1

Figure 1:
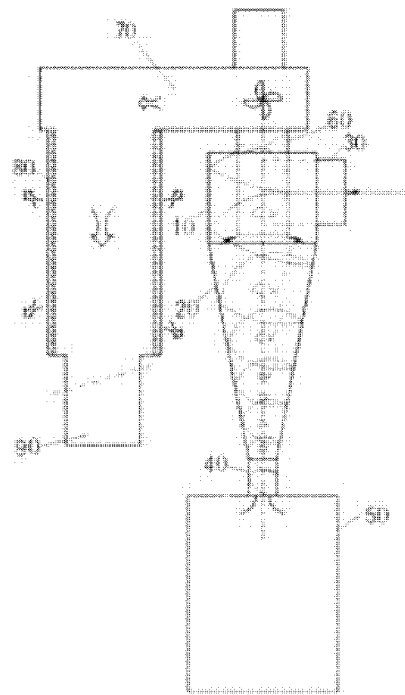
FIG. 1 is a schematic diagram of a conventional cyclone dust collector in the prior art.
Figure 2:
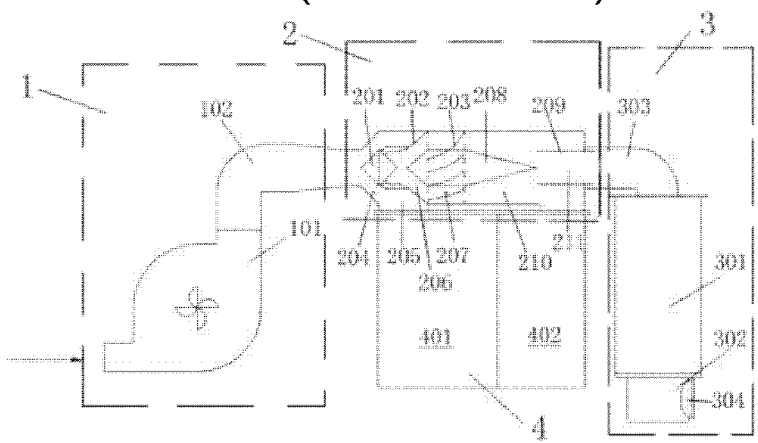
FIG. 2 is a schematic diagram of a dust separation apparatus according to Embodiment 1 of the present invention.

Referring to FIG. 2, a dust separation apparatus includes a dust intake unit 1 including a blower, an inertial separation unit, a centrifugal separation unit, and a filtering separation unit 3. The dust intake unit 1, the inertial separation unit, the centrifugal separation unit, and the filtering separation unit 3 are sequentially connected in series and together form a horizontal structure. The inertial separation unit and the centrifugal separation unit are connected in a horizontal-axis direction to form an inertial and centrifugal separation unit 2. A dust collection box 4 is provided below and connected to the inertial and centrifugal separation unit 2.

The expression "together form a horizontal structure" may be understood to mean that generally a length of the structure is greater than a height of the structure, where the main separation work is completed in a state of a horizontal-axis direction. The expression "sequentially connected in series" may be understood to mean that according to the listed order, the units are respectively sealed from the outside and are communicated with each other from the inside two by two. The expression "the inertial separation unit and the centrifugal separation unit are connected in a horizontal-axis direction to form an inertial and centrifugal separation unit" may be understood to mean that a chamber of the inertial separation unit and a chamber of the centrifugal separation unit are integrally formed or connected as one piece in a horizontal-axis direction. This specific embodiment is shown in FIG. 2. Preferably, the chamber of the inertial separation unit and the chamber of the centrifugal separation unit are integrally formed in the same horizontal-axis direction. The expression "connected" may be understood to be respectively sealed from the outside and communicated with each other from the inside. The expression "a dust collection box is provided below and connected to the inertial and centrifugal separation unit" may be understood to mean that the dust collection box is placed below the inertial and centrifugal separation unit, and the dust collection box is connected to the inertial and centrifugal separation unit.

Referring to FIG. 2, the dust intake unit 1 includes a blower 101 and a first pipe 102 for transition and connection. An air inlet of the blower 101 may be connected to a dust collection pipe 103 (referring to FIG. 3), and the blower 101 may work with the dust collection pipe in operation. The first pipe 102 is connected to the blower 101 and the inertial and centrifugal separation unit 2.

Referring to FIG. 2, a conical guide block 201, a baffle 202, and a cyclone blade 203 that are sequentially and fixedly connected are disposed inside a chamber of the inertial and centrifugal separation unit 2, the conical guide block 201 is placed in the middle of the chamber, and a first air duct 204 is formed at a periphery of the conical guide block. The baffle 202 is provided with a cavity, and a plurality of through holes is provided on a surface of the baffle. The baffle 202 preferably has a conical frustum shape. As shown in FIG. 2, the baffle 202 is formed by removing one conical body from the bottom of one frustum. Through holes are provided at a side position of the frustum. A second air duct 205 is formed at an outer periphery of the baffle 202.

A third air duct 206 is formed inside the cavity of the baffle 202. The cyclone blade 203 has a spiral form. A tangential direction of the cyclone blade points to the dust collection box 4. A fourth air duct 207 is formed at a periphery of the cyclone blade 203. The first air duct 204, the second air duct 205, the third air duct 206, and the fourth air duct 207 are connected sequentially. The second air duct 205 is connected to the dust collection box.

A conical flow-guide mechanism 208 and a flow-guide outlet pipe 209 are further disposed inside the chamber of the inertial and centrifugal separation unit 2. The conical flow-guide mechanism 208 and the flow-guide outlet pipe 209 are both located in the middle of the chamber, and a conical tip of the conical flow-guide mechanism 208 is made to approach, be level with or enter a pipe port of the flow-guide outlet pipe 209. A fifth air duct 210 is formed at a periphery of the conical flow-guide mechanism and the flow-guide outlet pipe. A sixth air duct 211 is formed inside the flow-guide outlet pipe. The fifth air duct 210 is connected to the fourth air duct 207 and the fifth air duct 210 is connected to the dust collection box 4. In this way, the fine dust may follow a flow-guide effect of the conical flow-guide mechanism, and the air flow smoothly enters the flow-guide outlet pipe and further enters the filtering separation unit, thereby reducing turbulence of the air flow and reducing noise.

Figure 3:
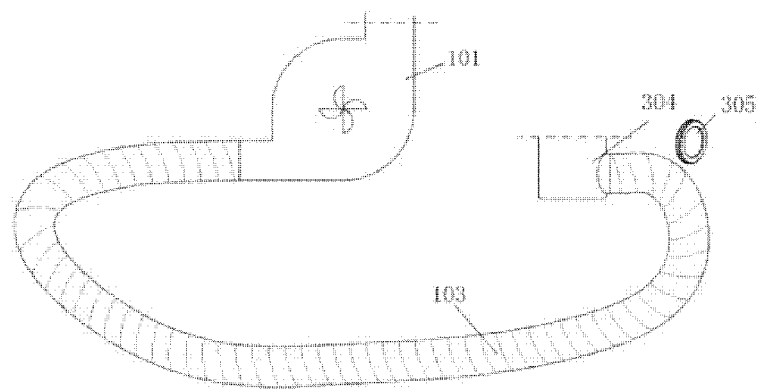
FIG. 3 is a schematic diagram of sealed self-cleaning of a dust collection barrel according to Embodiment 1 of the present invention.

Referring to FIG. 2 and FIG. 3, the filtering separation unit 3 includes a filter cylinder 301, a dust collection barrel 302 located below the filter cylinder 301, and a second pipe 303 for transition and connection. The second pipe 303 is connected to the inertial and centrifugal separation unit 2 and the filter cylinder 301. The dust collection barrel 302 is provided with a dust cleaning hole 304 having a standard dust-collection-pipe diameter. The dust cleaning hole is provided with a sealing cap 305 and a dust collection pipe 103. The sealing cap 305 may cover the dust cleaning hole 304 in a sealed manner. The dust collection pipe 103 may be connected to the dust cleaning hole 304 and the blower 101.

Figure 4:
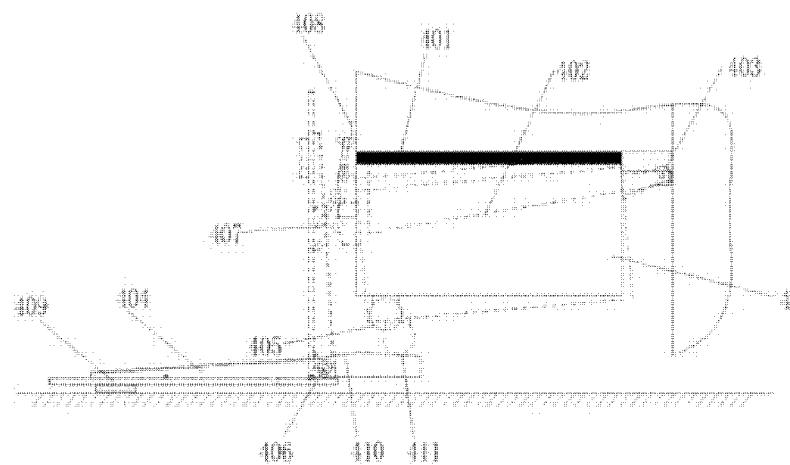
FIG. 4 is a schematic diagram of quick mounting and removal of a dust collection box according to Embodiment 1 of the present invention.

The dust collection box 4 is preferably an integral double-chamber structure, that is, includes a first receiving chamber 401 and a second receiving chamber 402 that are integrally formed. The first receiving chamber 401 is connected to the second air duct 205. The second receiving chamber 402 is connected to the fifth air duct 210. A roller and a fastener are disposed on the dust collection box. The roller is provided with a track. The inertial and centrifugal separation unit is provided with a retaining ring. Mounting and removal of the dust collection box are achieved by means of sliding of the roller on the track and fastening and releasing of the fastener on the retaining ring. Preferably, referring to FIG. 4, a first roller set 403 is disposed at a right end of the dust collection box 4, and a first track is provided below the first roller set 403. A second roller set 405 is disposed at a bottom end of the dust collection box 4, and a second track is provided below the second roller set 405. A fastener 407 is disposed at a left end of the dust collection box 4, and a corresponding retaining ring 408 is provided on the inertial and centrifugal separation unit. The second track includes a short guiderail 410 and a long guiderail 404. The short guiderail 410 and the long guiderail 404 are hinged about a rotating rod 406. The short guiderail is provided with an inclined surface 411 and the long guiderail may be rotated and lifted as a front door 409. The inertial and centrifugal separation unit is provided with a sealing strip 401 at an end connected to the dust collection box.

A working process of the dust collection box is as follows:

In operation, the dust collection box 4 is pushed into the body of the dust separation apparatus along the long guiderail 404 on the front door 409 by using the second roller set 405. At the same time, the first roller set 403 also rolls along an upper guiderail 402 on an inner side of the body. When reaching a specified position, the second roller set enters the short guiderail 410, and is caught on the inclined surface 411 of the short guiderail. The fastener 407 is hung on the retaining ring 408 and pressed tightly. The dust collection box 4 is then raised to press against a lower plane of the dust processing apparatus. The sealing strip 401 is pressed tightly for sealing. After locking, the front door 409 is rotated about the rotating rod 406 and closed at a position of 90 degrees.

An overall working principle of this dust separation apparatus is as follows:

The blower 101 is started such that a dust-containing air flow is sucked into the blower 101. The dust-containing air flow passes through the first pipe 102 to enter the inertial and centrifugal separation apparatus 3 that integrates inertial separation and centrifugal separation. The separated dust enters the dust collection box 4. The remaining dusty air containing fine dust passes through the pipe 303 to enter the filter cylinder 301. Clean air is discharged, and the fine dust is left on an inner wall of the filter cylinder. A part of the fine dust falls into the dust collection barrel 302 under the effect of the gravitational force.

Figure 5:
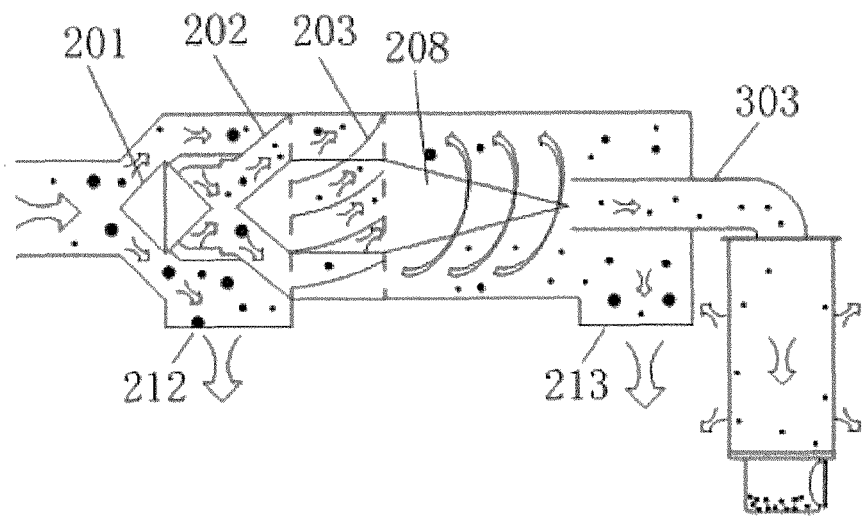
FIG. 5 is a schematic diagram of a working process of a separation unit according to Embodiment 1 of the present invention.

More specifically, a working process of this dust separation apparatus is as follows:

Referring to FIG. 2, the blower 101 rotates to enable dust-carrying air to enter the blower 101 due to a negative pressure. The air is then subjected to a positive pressure to enter the inertial and centrifugal separation unit 2 and the filtering separation unit 3. Referring to FIG. 5, the dust-containing air enters the first air duct 204 through the conical guide block 201, and dust having relatively large particle diameters crashes into the baffle 202 in the second air duct 205 and falls into a primary separation port 212 which is connected to the first receiving chamber 401. The remaining dust having medium and small particle diameters and fine particle diameters continues to flow with air to enter the third air duct 206 and the fourth air duct 207. After passing through the cyclone blade 203, the dust is in high-speed rotational movement. Under the effect of the centrifugal force, the dust makes spiral movement about a side wall of a chamber of the inertial and centrifugal separation unit. The dust having medium and small particle diameters and relatively large mass makes spiral movement near the side wall (in the fifth air duct 210). Most of the dust enters a secondary separation port 213 which is connected to the second receiving chamber 402 along the tangential direction under the effect of the centrifugal force, and thus falls into the second receiving chamber 402 of the dust collection box 4. The fine dust having small mass makes spiral movement near an axis of the side wall. A part of the dust enters the secondary separation port 213 along the tangential direction under the effect of the centrifugal force, to fall into the second receiving chamber 402 of the dust collection box. Another part of the dust enters the sixth air duct 211 as spiral movement at the position of the axis, passes through the second pipe 303, and is guided into the filter cylinder 301. In addition, the flow guide structure 208 is added at a rear end of the spiral blade 203, thereby further reducing turbulence. Eventually, dust that passes through the separation unit 2 has fine particle diameters, the dust content is very low, and relatively clean dusty air is obtained. The relatively clean dusty air enters the second pipe 303 through the outlet and is guided into the filter cylinder 301. A filter cartridge provided in the filter cylinder 301 is used for further filtering to afford clean air. Finally, the clean air is discharged from the filter cylinder. When the dust undergoes the filtering separation at the filter cylinder 301, only a very small part of fine dust is adhered on a filter screen, and most of the fine dust falls into the dust collection barrel 302 at a lower end of the filter cylinder under the effect of the gravitational force. When the dust collection barrel 302 needs to be cleaned, the fine dust in the dust collection barrel 302 can be sucked into the dust collection box 4 by opening the cap 305 on a side surface of the dust collection barrel and connecting the dust collection pipe 103 to the air inlet of the blower 101, so that the dust in the dust collection barrel 302 is completely cleaned.

Through successive tests using a gravity method, after inertial separation and centrifugal separation are performed on dust that is sucked into the dust intake unit, 97%-99% of the dust having large particle diameters is separated into the dust box, and only a very small amount (remaining 1% to 3%) of fine dust enters the filter cylinder for filtering separation.

A dust separation method according to the present invention includes the following steps:

S1. arranging a dust intake unit to suck dust;

S2. arranging an inertial separation unit, a centrifugal separation unit, and a filtering separation unit that are sequentially connected in series and as one piece in a horizontal structure, to perform inertial separation, centrifugal separation, and filtering separation sequentially on the dust in S1, so that following the inertial separation and the centrifugal separation, 97%-99% of dust having large particle diameters is separated, and the remaining dust is filtered and separated by the filtering separation unit; and S3. connecting the inertial separation unit to the centrifugal separation unit in a horizontal-axis direction to form an inertial and centrifugal separation unit, and arranging a dust collection box that is located below and connected to the inertial and centrifugal separation unit, to receive the 97%-99% of dust in S2.

Embodiment 2

Figure 6:
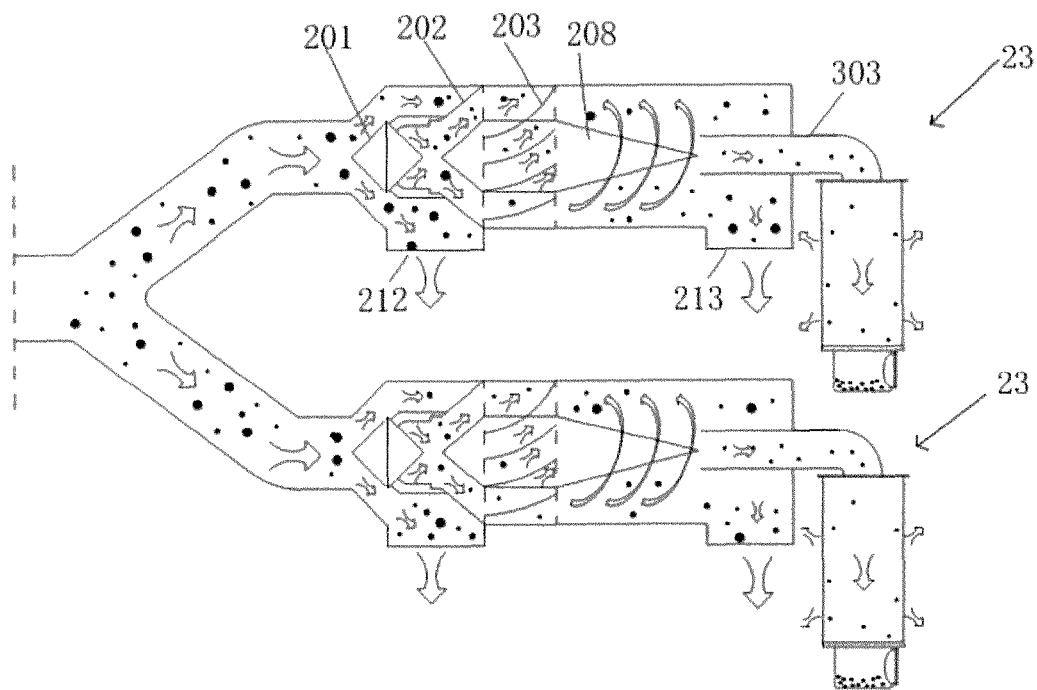
FIG. 6 is a schematic diagram of side-by-side arrangement of air ducts for dusty air of two separation units according to Embodiment 2 of the present invention.

This embodiment is different from Embodiment 1 that, referring to FIG. 6, the inertial separation unit, the centrifugal separation unit, and the filtering separation unit that are sequentially connected in series form a plurality of separation units 23. The word "a plurality of" refers to "two or more". FIG. 6 shows two separation units 23. Each of the separation units is connected to the dust intake unit. Where the dust intake unit has a fixed intake air volume for dust, a pipe diameter of each separation unit is designed such that an air flow rate is controlled between 13 m/s and 22 m/s. In this way, the centrifugal force of dust particles is increased, thereby improving the separation efficiency of dust.

For the plurality of separation units 23 that are connected in parallel, the primary separation ports 212 are all connected to the first receiving chamber in the dust collection box, and the secondary separation ports 213 are all connected to the second receiving chamber in the dust collection box. The air pressure in the dust collection box 4 is a positive pressure, so that turbulence is effectively prevented.

Embodiment 3

An intelligent control system for dust separation includes the dust separation apparatus according to any of the solutions above and an intelligent control unit. The intelligent control unit includes a master-machine controller mounted on the dust separation apparatus and a slave-machine controller mounted on a dust-generating device for dust removal. The master-machine controller includes a first MCU control module, an I/O interface module, and a first WiFi wireless communication module, and the MCU control module is connected to an external device through the I/O interface module, and communicates with the slave-machine controller through the WiFi wireless communication module. The slave-machine controller consists of a second MCU control module, an interface module, a second WiFi wireless communication module, and a current transformer. The current transformer is configured to detect a current value of a motor of the dust-generating device, and the second MCU control module determines, according to the current value, whether the dust-generating device is in an on or off state, and sends the state of the device to the master-machine controller through the second WiFi wireless communication module. The master-machine controller controls, according to the state of the dust-generating device, the dust separation apparatus to start or stop through a frequency converter.

An intelligent control method of this intelligent control system for dust separation includes the following steps:

S10: setting operation parameters of the dust separation apparatus on the master-machine controller, the operation parameters including a rotational speed of a motor, a delayed time of delayed stopping, and operation control parameters of the slave-machine controller that can be controlled in a coordinated manner, collecting a dusty-air pressure, a dust height in a dust box, a rotational speed of a motor, and a power of the motor in the dust separation apparatus in real time, monitoring operation parameters in real time, and determining whether the working condition is abnormal;

S20: when the working condition is abnormal, providing an alarm indication and automatically stopping the dust separation apparatus; and S30: automatically detecting, by the slave-machine controller, the on and off of the dust-generating device and communicating with the master-machine controller through the WiFi wireless communication technology, and controlling, by the master-machine controller, the apparatus to start or stop to coordinate with the dust-generating device, wherein S10 and S30 may be performed at the same time.

Preferably, the intelligent control method further includes S40: when a pipe network environment changes, automatically detecting, by the master-machine controller, a change in the output power of the motor, and automatically adjusting the rotational speed of the blower, to make the output power of the motor stay constant at a rated power. In this way, it can be ensured that the motor keeps operating at full load and the motor is not overloaded. Also, it is ensured that the working efficiency of the blower stays constant at the maximum designed efficiency. When a small-diameter dust collection pipe is used for dust collection, the dust collection capability can be improved. When a large-diameter dust collection pipe is used for dust collection, it can be ensured that the motor is not overloaded.

The expression "a pipe network environment changes" includes, but is not limited to, changes in a pipe diameter of the dust collection pipe.

Detailed description is further provided below by using the accompanying drawings.

Figure 7:
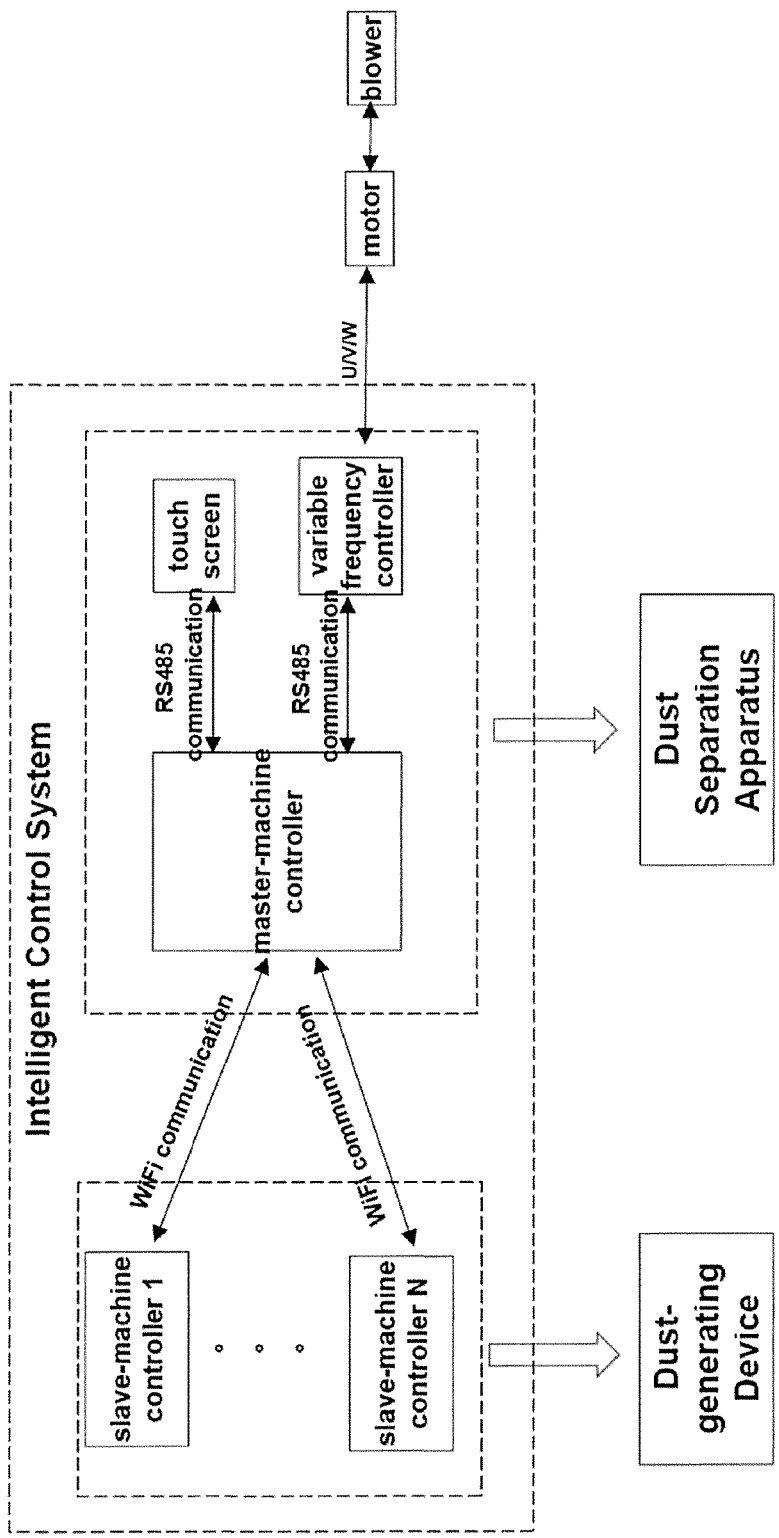
FIG. 7 is a general schematic structural diagram of an intelligent control system according to Embodiment 3 of the present invention.

FIG. 7 is a general schematic structural diagram of the intelligent control system. The entire intelligent control system includes parts such as a slave-machine controller mounted on a dust-generating device, a master-machine controller mounted on this apparatus, a variable frequency controller, and a touch screen. The slave-machine controller communicates with the master-machine controller through wireless WiFi. The master-machine controller communicates with the touch screen and the variable frequency controller through RS485. Upon detecting starting or stopping of the dust-generating device, the slave-machine controller sends a starting or stopping message to the master-machine controller through a wireless WiFi communication module. The master-machine controller controls the ON or OFF of a blower by using the variable frequency controller, so as to achieve coordinated starting and stopping of the dust-generating device and this apparatus (the dust separator). One master-machine controller may be connected to and communicate with a plurality of slave-machine controllers. That is, one dust separation apparatus may be connected to a plurality of dust-generating devices through a wireless network for providing a dust removal service to the plurality of dust-generating devices. In addition, working parameters such as delayed stopping and a rotational speed of the blower may be set on the master-machine controller by using a touch screen. Operation parameters such as a dusty-air pressure in an air duct, a dust height in a dust box, a power load of a motor are collected and displayed in real time, and the working condition is monitored in real time. When the working condition is abnormal, an alarm indication is provided and corresponding intelligent control is performed, thereby ensuring safety and reliability of the device in operation.

Figure 8:
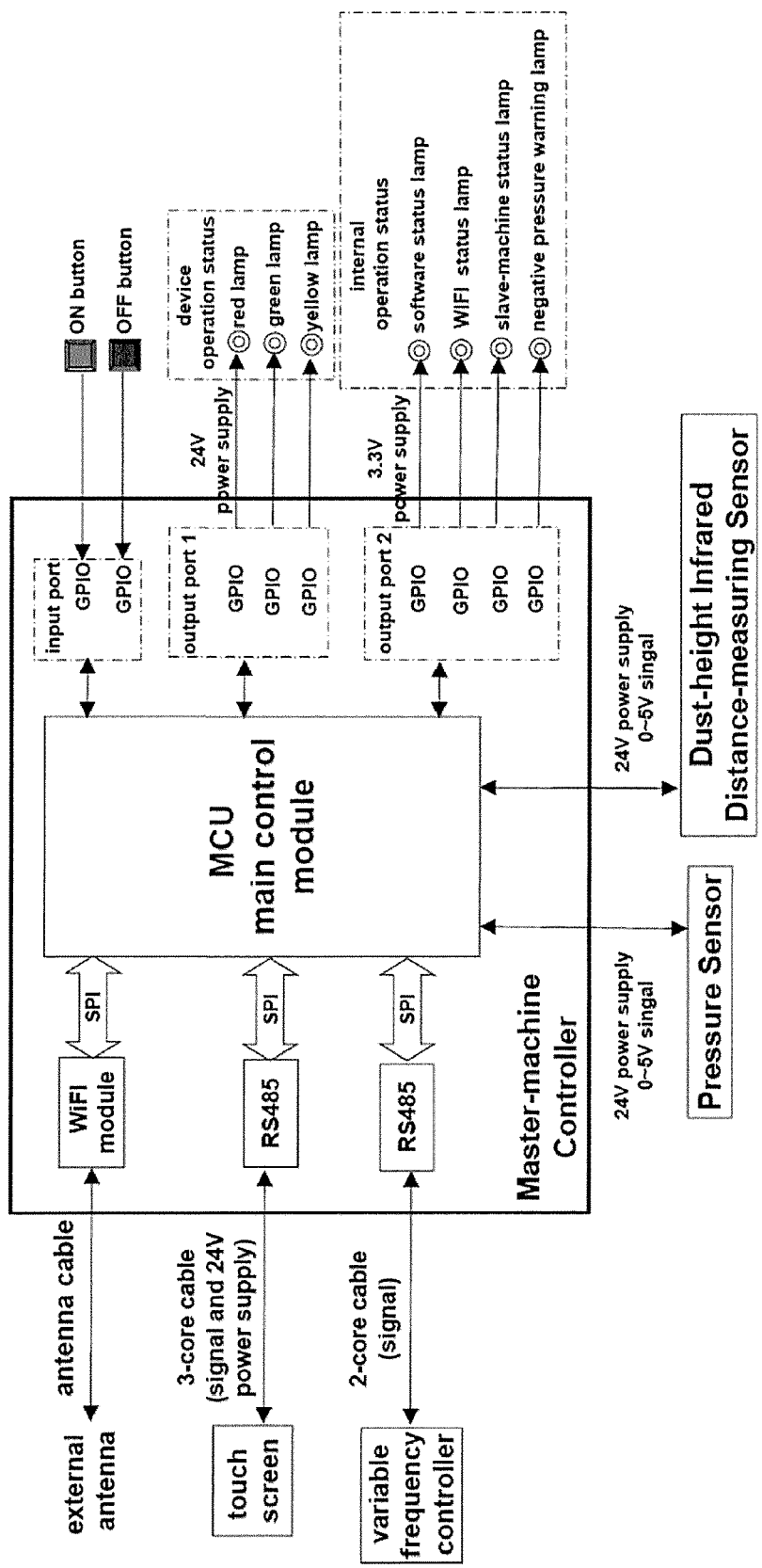
FIG. 8 is a schematic diagram of a master-machine controller of the intelligent control system according to Embodiment 3 of the present invention.

FIG. 8 is a structural diagram of a master-machine controller of the intelligent control system that is mounted on this apparatus. A core of the master-machine controller is an MCU control module. The MCU control module is connected to an external device by using an I/O interface module, where the connected external device includes a device operation status indicating lamp, an internal operation indicating lamp, on/off operation buttons, and the like. The MCU control module is further connected to a pressure sensor that detects a gas pressure and an infrared sensor that detects a dust height. The MCU control module is connected to the touch screen and the variable frequency controller through an RS485 communication interface. The MCU control module communicates with the slave-machine controller through a WiFi wireless communication module. The master-machine controller may collect in real time a dusty-air pressure, a dust height in a dust box, an output power of a motor, a rotational speed of a blower, and the like. These parameters and the device operation status are displayed on a touch screen, and corresponding intelligent control is made on an operation process of this apparatus based on these parameters.

Figure 9:
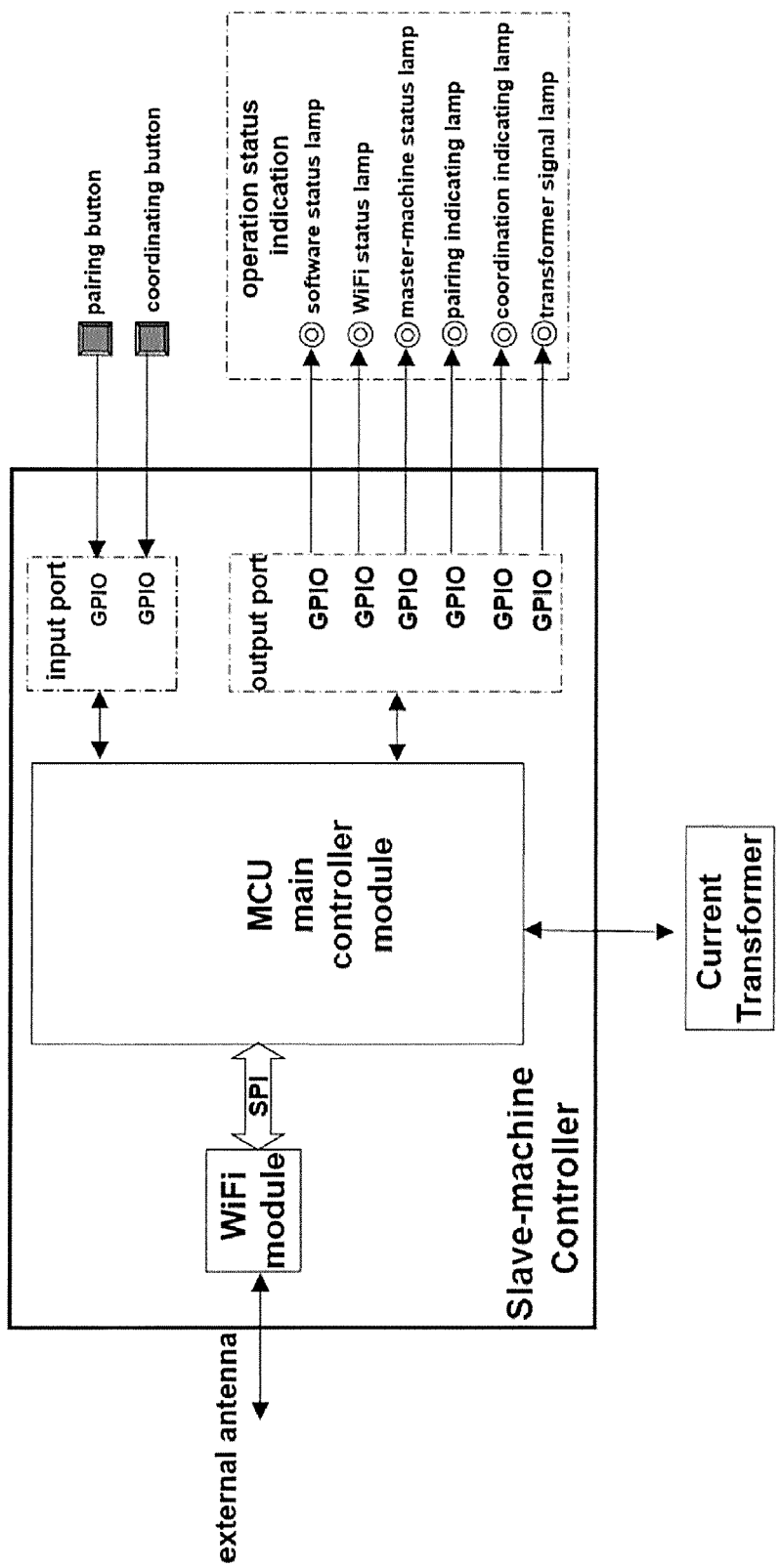
FIG. 9 is a schematic diagram of a slave-machine controller of the intelligent control system according to Embodiment 3 of the present invention.

FIG. 9 is a schematic diagram of a slave-machine controller of the intelligent control system that is mounted on a dust-generating device. The slave-machine controller consists of an MCU control module, an interface module, a WiFi wireless communication module, and a current transformer. A current value of a motor of the dust-generating device is detected by the current transformer. The MCU determines, according to the current value, whether the dust-generating device is in an on or off state, and sends the state of the device to the master-machine controller through the wireless communication module. The master-machine controller controls, according to the state of the dust-generating device, this apparatus to start and stop by using a frequency converter. Indication lamps are mounted on the slave-machine controller to indicate a software operation status, a WiFi communication status, an operation status of this apparatus (the dust separation apparatus), an operation status of the dust-generating device, and the like. The slave-machine controller is further externally provided with buttons for pairing and coordinated operation with the master-machine controller.

Figure 10:
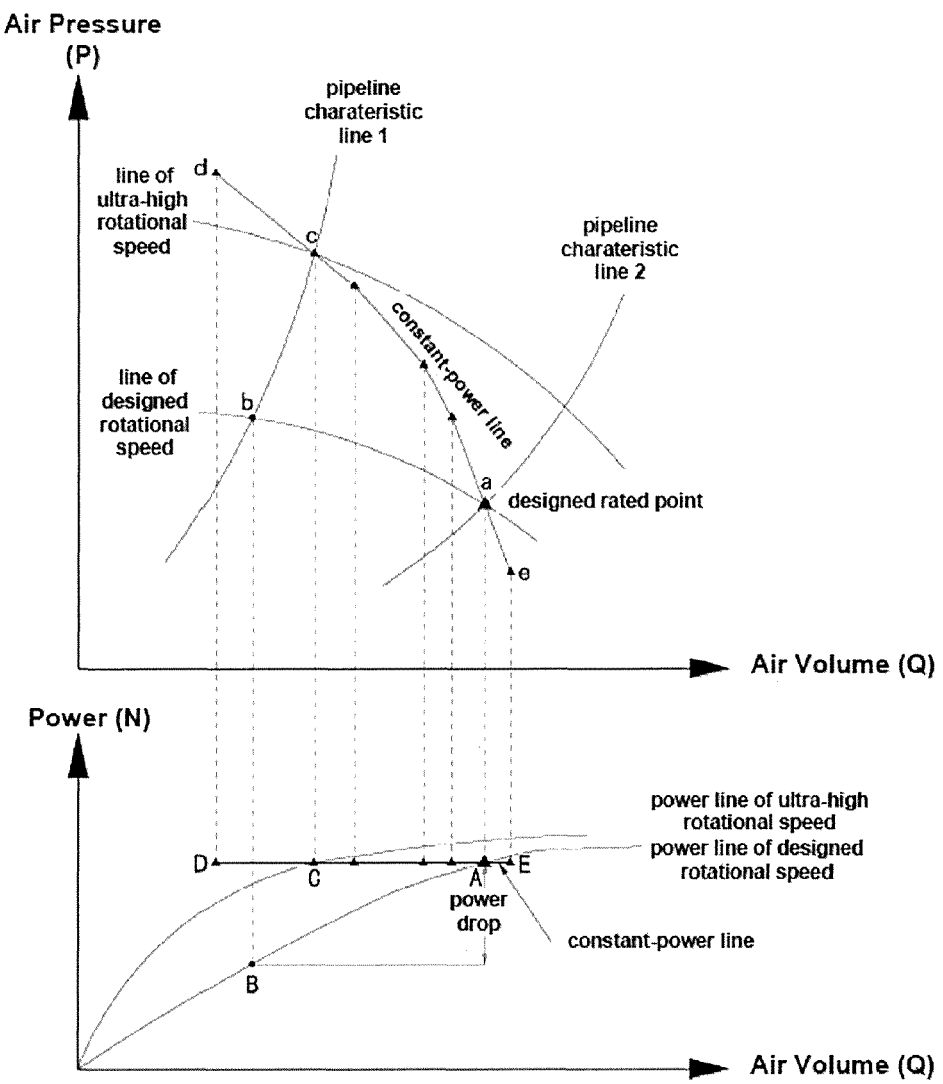
FIG. 10 is a schematic diagram of constant-power operation of the intelligent control system according to Embodiment 3 of the present invention.

FIG. 10 is a schematic diagram showing that this apparatus always operates at a rated power to improve the dust collection capability. If the blower operates at a fixed designed rotational speed, a characteristic curve of the blower corresponds to a line of a designed rotational speed, and an output power of the motor corresponds to a power line of a designed rotational speed. If the pipe network environment corresponds to a pipe network characteristic curve 2, the blower works at an intersection a between the line of the designed rotational speed and the pipe network characteristic curve 2. At this point, if the output power of the motor just reaches a designed rated power value, the efficiency of the blower also reaches the maximum designed efficiency. In this case, if a pipe diameter of the pipe network is reduced, the pipe network environment corresponds to a pipe network characteristic curve 1. The working point of the blower moves leftwards along the line of the designed rotational speed to an intersection b with the pipe network curve 1. The output power of the motor also moves leftwards along the power line of the designed rotational speed from a point A to a point B, where a power at the point B is obviously less than the rated power at the point A. In the present invention, the intelligent control system can monitor the output power of the motor in real time. When the output power is less than the rated power, the frequency converter is controlled to increase the rotational speed of the blower, and the blower works on a rotational speed line of a speed exceeding the designed rotational speed. In this case, the working point of the blower moves to a point c on a line of an ultra-high rotational speed, and the output power of the motor also moves to a point C on a power line of an ultra-high rotational speed. A power value at the point C is the same as a power value at the point A. The efficiency of the blower at the point C is the same as the efficiency at the point A. The dust collection capability at the point c is greater than that at a point b (a wind pressure is also greater than that at the point b, and an air volume is also greater than that at the point b). In the present invention, the output power of the motor is monitored in real time by the intelligent control system, and once the output power changes, the frequency converter is controlled to adjust the rotational speed of the motor, so that the output power of the motor stays constant at the rated power. When the pipe network environment changes, the output power of the motor is always controlled to slide on a constant-power line DCAE. The characteristic curve of the blower no longer slides along a constant-speed line, and instead slides along a constant-power line dcae. This apparatus always operates at the rated power. When a small-diameter dust collection pipe is used for dust collection, the rotational speed of the blower can be automatically increased to improve the dust collection capability. When a large-diameter dust collection pipe is used for dust collection, if the load is excessively heavy, the rotational speed of the blower is automatically reduced to ensure that the motor is not overloaded.

This embodiment provides an intelligent control system of a dust separation apparatus that integrates three dust separation technologies, that is, inertial separation, centrifugal separation, and filtering separation. By means of the intelligent control system, the dust removal efficiency is high, a filter screen is less prone to clogging, dust in a dust box is easy to clean, the device has a small volume, the working noise is low, an output power of a motor stays constant at a rated power, the efficiency of a blower stays constant at the maximum designed efficiency, and an operation process can be intelligently controlled.

It should be understood that although this specification is described by means of specific embodiments, the specific embodiments are not intended to include only one independent technical solution. Such a description in this specification is provided merely for the purpose of clarity. A person skilled in the art should take this specification as a whole. The technical solutions in the embodiments can also be properly combined to form another embodiment comprehensible to a person skilled in the art.

A series of detailed descriptions listed above are merely specific description of feasible embodiments of the present invention, and are not used to limit the protection scope of the present invention. Any equivalent embodiment or variation made without departing from the technical spirit of the present invention should fall within the protection scope of the present invention.

What is claimed is:

1. A dust separation apparatus, comprising a dust intake unit comprising a blower, an inertial separation unit, a centrifugal separation unit, and a filtering separation unit, wherein the dust intake unit, the inertial separation unit, the centrifugal separation unit, and the filtering separation unit are sequentially connected in series and together form a horizontal structure, the inertial separation unit and the centrifugal separation unit are connected in a horizontal-axis direction to form an inertial and centrifugal separation unit, a dust collection box is provided below and connected to the inertial and centrifugal separation unit, and the filtering separation unit comprises a dust collection barrel, wherein a conical guide block, a baffle, and a cyclone blade that are sequentially and fixedly connected are disposed inside a chamber of the inertial and centrifugal separation unit, wherein the inertial and centrifugal separation unit and the filtering separation unit form one or a plurality of separation units, and when a plurality of separation units is formed, each of the separation units is connected to the dust intake unit; and where the dust intake unit has a fixed intake air volume for dust, a pipe diameter of each separation unit is designed such that an air flow speed is controlled between 13 m/s and 22 m/s,
    wherein a roller and a fastener are disposed on the dust collection box, the roller is provided with a track, the inertial and centrifugal separation unit is provided with a retaining ring, and mounting and removal of the dust collection box are achieved by means of sliding of the roller on the track and fastening and releasing of the fastener on the retaining ring,
    wherein the filtering separation unit comprises a filter cylinder and the dust collection barrel located below the filter cylinder, the dust collection barrel is provided with a dust cleaning hole having a standard dust-collection-pipe diameter, and the dust cleaning hole is provided with a sealing cap and a dust collection pipe; the sealing cap is configured to cover the dust cleaning hole in a sealed manner; and the dust collection pipe is configured to be connected to the dust cleaning hole and the blower, wherein the conical guide block is placed in the middle of the chamber, and a first air duct is formed at a periphery of the conical guide block; the baffle is provided with a cavity, a second air duct is formed at an outer periphery of the baffle, and a third air duct is formed inside the cavity of the baffle; and the cyclone blade has a spiral form, the cyclone blade enables spiral movement of dust in dust-containing air that flows past it, a tangential direction of the spiral movement points to the dust collection box, a fourth air duct is formed at a periphery of the cyclone blade, the first air duct, the second air duct, the third air duct, and the fourth air duct are connected sequentially, and the second air duct is connected to the dust collection box; and wherein a conical flow-guide mechanism and a flow-guide outlet pipe are further disposed inside the chamber of the inertial and centrifugal separation unit, the conical flow-guide mechanism and the flow-guide outlet pipe are both located in the middle of the chamber, and a conical tip of the conical flow-guide mechanism is made to approach, be level with or enter a pipe port of the flow-guide outlet pipe; a fifth air duct is formed at a periphery of the conical flow-guide mechanism and the flow-guide outlet pipe, and a sixth air duct is formed inside the flow-guide outlet pipe; and the fifth air duct is connected to the fourth air duct, and the fifth air duct is connected to the dust collection box.

2. An intelligent control system for dust separation, comprising the dust separation apparatus according to claim 1 and an intelligent control unit, wherein the intelligent control unit comprises a master-machine controller mounted on the dust separation apparatus and a slave-machine controller mounted on a dust-generating device for dust removal; the master-machine controller comprises a first MCU control module, an I/O interface module, and a first WiFi wireless communication module, and the first MCU control module is connected to an external device through the I/O interface module, and communicates with the slave-machine controller through the first WiFi wireless communication module; the slave-machine controller consists of a second MCU control module, an interface module, a second WiFi wireless communication module, and a current transformer; the current transformer is configured to detect a current value of a motor of the dust-generating device, and the second MCU control module determines, according to the current value, whether the dust-generating device is in an on or off state, and sends the state of the device to the master-machine controller through the second WiFi wireless communication module; and the master-machine controller controls, according to the state of the dust-generating device, the dust separation apparatus to start or stop through a frequency converter.

3. An intelligent control method of the intelligent control system for dust separation according to claim 2, comprising the following steps:
    S10: setting operation control parameters of the dust separation apparatus on the master-machine controller, collecting a dusty-air pressure, a dust height in a dust box, a rotational speed of a motor, and a power of the motor in the dust separation apparatus in real time, monitoring operation parameters in real time, and determining whether the working condition is abnormal;
    S20: when the working condition is abnormal, providing an alarm indication and automatically stopping the dust separation apparatus; and
    S30: automatically detecting, by the slave-machine controller, the on and off of the dust-generating device and communicating with the master-machine controller through the WiFi wireless communication technology, and controlling, by the master-machine controller, the dust separation apparatus to start or stop to coordinate with the dust-generating device, wherein
    S10 and S30 may be performed at the same time.

4. The intelligent control method according to claim 3, further comprising S40: when a pipe network environment changes, automatically detecting, by the master-machine controller, a change in the output power of the motor, and automatically adjusting the rotational speed of the blower, to make the output power of the motor stay constant at a rated power, and to make the working efficiency of the blower stay constant at the maximum designed efficiency.

* * * * *